United States Patent [19]

O'Halloran

[11] Patent Number: 5,022,817
[45] Date of Patent: Jun. 11, 1991

[54] THERMOSTATIC CONTROL OF TURBINE COOLING AIR

[75] Inventor: Bernard O'Halloran, Scottsdale, Ariz.

[73] Assignee: Allied-Signal Inc., Morris Township, N.J.

[21] Appl. No.: 405,991

[22] Filed: Sep. 12, 1989

[51] Int. Cl.⁵ ............................................. F01D 5/00
[52] U.S. Cl. ..................................... 415/115; 415/116; 416/96 A; 416/97 R
[58] Field of Search ............... 415/114, 115, 116, 117, 415/47, 175; 416/95, 96 R, 97 R, 96 A, 97 A

[56] References Cited

U.S. PATENT DOCUMENTS

| | | | |
|---|---|---|---|
| 2,787,440 | 4/1957 | Thompson, Jr. | 415/47 |
| 2,924,388 | 2/1960 | Beck et al. | 236/99 |
| 2,977,089 | 3/1961 | McCarty et al. | 416/96 |
| 3,164,367 | 1/1965 | Lynch | 416/97 |
| 3,575,528 | 4/1971 | Beam, Jr. | 416/97 R |
| 3,712,756 | 1/1973 | Kalikow et al. | 415/175 |
| 3,781,129 | 12/1973 | Aspinwall | 416/97 |
| 3,782,852 | 1/1974 | Moore | 416/97 |
| 4,136,516 | 1/1979 | Corsmeier | 60/39.09 R |
| 4,162,136 | 7/1979 | Parkes | 416/97 R |
| 4,213,738 | 7/1980 | Williams | 415/115 |
| 4,252,501 | 2/1981 | Peill | 416/97 R |
| 4,327,864 | 5/1982 | Gupta | 236/86 |
| 4,505,640 | 3/1985 | Hsing et al. | 416/97 R |
| 4,526,512 | 7/1985 | Hook | 416/97 R |
| 4,595,298 | 6/1986 | Frederick | 374/149 |
| 4,651,683 | 3/1987 | Nishida | 123/41.15 |
| 4,684,322 | 8/1987 | Clifford et al. | 416/95 |
| 4,730,982 | 3/1988 | Kervistin | 416/95 |
| 4,786,234 | 11/1988 | Readnour | 416/97 R |

Primary Examiner—Edward K. Look
Assistant Examiner—Hoang Nguyen
Attorney, Agent, or Firm—Steven R. Linne; James W. McFarland; Robert A. Walsh

[57] ABSTRACT

A gas turbine engine is provided with hollow guide vanes having thermally responsive actuators mounted within each for individually controlling the cooling air flow therethrough in response to local temperature variations.

12 Claims, 2 Drawing Sheets

THERMOSTATIC CONTROL OF TURBINE COOLING AIR

TECHNICAL FIELD

This invention relates generally to gas turbine engines and more particularly to methods and apparatus for internally cooling the stationary turbine vanes.

BACKGROUND OF THE INVENTION

Gas turbine power plants are used as the primary propulsive power source for aircraft, in the forms of jet engines and turboprop engines, as auxiliary power sources for driving air compressors, hydraulic pumps, etc. on aircraft, and as stationary power supplies such as backup electrical generators for hospitals and the like. The same basic power generation principles apply for all of these types of gas turbine power plants. A gas turbine engine in its basic form includes a compressor section, a combustion section and a turbine section arranged to provide a generally axially extending flow path for the working gases. Compressed air is mixed with fuel and burned, and the energetic hot combustion gases are directed against stationary turbine guide vanes in the one or more turbine stages of the engine. The vanes turn the high velocity gas flow partially sideways to impinge at the proper angle upon turbine blades mounted on a turbine disk or wheel that is free to rotate.

The force of the impinging gas causes the turbine disk to spin at high speed. The power so generated is then used to draw more air into the engine, in the case of the jet propulsion engine, and both draw more air into the engine and also supply shaft power to turn the propeller, an electric generator, or for other uses, in the cases of the other applications. The high velocity combustion gas is then passed out the aft end of the gas turbine which, in the propulsion engine applications, also supplies a forward reaction force to the aircraft.

As is well known, the thermal efficiency, and therefore power, produced by any engine is a function of, among other parameters, the temperature of the working gases admitted into the turbine section. That is, all other things being equal, an increase in power from a given engine can be obtained by increasing the combustion gas temperature. This is particularly true for small turboshaft or turboprop engines where very small changes in the operating temperature can substantially affect the engine output. For example, it has been determined in a typical engine of this type that a single degree centigrade increase in the temperature of the working gases can increase the engine power by as much as 15 horsepower. However, as a practical matter, the maximum feasible gas temperature, and hence the efficiency and output of the engine, is limited by the high temperature capabilities of the various turbine section components exposed to the hot gas flow.

The turbine blades and vanes lie at the heart of the power plant, and it is well established that in most cases they are the limiting factors in achieving improved power plant efficiency. In particular, because they are subjected to high heat and stress loadings as they are impacted by the hot gas, there is a continuing effort to identify improvements to the construction and materials of turbine blades and vanes to achieve ever higher performance.

In order to achieve more of the power theoretically available from higher turbine temperatures, the blades and vanes must be effectively cooled to a safe temperature which is considerably less than the maximum working gas temperature. The prior art has provided many designs for supplying a flow of air, typically bled from the compressor section, to cooling passages within the blades and/or vanes. See, for example, U.S. Pat. Nos. 4,136,516; 4,162,136; 4,505,640; 4,684,322; 4,759,688 and 4,786,234.

However, any use of the compressor air for cooling decreases the amount available for combustion, reducing the maximum power available. Furthermore, any work or heat added to this air is energy lost to the turbine cycle, thus reducing overall thermal efficiency. It would therefore be desirable to adjust the amount of air drawn off for cooling depending on the need for such: that is in response to variations in engine operating conditions. Accordingly, attempts have been made to achieve some degree of control of the cooling air flows by making use of the known dimensional variations of certain elements of the cooling system when they are subjected to the variations in engine speed or, more directly, gas temperature. See, for example, U.S. Pat. Nos. 3,712,756; 4,213,738 and 4,730,982.

All of these designs possess significant problems in making efficient use of the cooling air in that they require a preliminary design choice to be made concerning the amount of cooling necessary for each group or type of component. That is, the maximum exposure temperature during the severest engine operating conditions, such as during take-off when engine speed and loading is highest, is determined and compared to the permissible operating temperature of the components. The calculated amount of cooling air necessary to achieve adequate cooling under those transient conditions is provided and usually increased even more to provide a margin of safety and/or a lengthened operating life for the components. Once an engine is designed with the desired cooling flows established, it is difficult and/or expensive to change even if full scale engine tests determine that a different amount of cooling would be optimum.

Another problem with the prior art designs is that they assume a known or uniform temperature distribution around the central axis of the turbine. However, as will be explained later, such an assumption is generally not accurate. Circumferential variations in gas temperature are not as much a problem for the rapidly rotating turbine blades, which are affected by the average gas temperature, but seriously affect the cooling needs and/or the life of the stationary guide vanes.

Thus it is an object of the present invention to provide a method and apparatus for adjusting the flow of cooling air to a turbine component depending on the need therefore so as to conserve cooling air.

Another object of the invention is to provide means for varying the cooling air flow to turbine components in response to the temperature of the components so as to avoid overheating.

A further object of the invention is to provide a means for supplying a varying amount of cooling air to each of a series of turbine guide vanes to compensate for circumferential variations in combustion gas temperature.

SUMMARY OF THE INVENTION

The present invention aims to overcome the disadvantages of the prior art as well as offer certain other advantages by providing an effective means for thermostatically controlling the cooling air flow through each individual turbine vane. Basically, the invention utilizes a thermally responsive actuator mounted within each turbine vane and adapted to adjust the position of an attached metering valve to form a means for admitting more or less cooling air into a hollow vane. Preferably, the thermally responsive actuator is a hermetically sealed, convoluted cylinder, i.e. bellows, containing a high temperature vaporizable material, such as liquid sodium. As the temperature of a vane rises, the liquid sodium vaporizes and expands the bellows and moves an attached tapered pin in a flow control orifice to allow more cooling air to flow into the vane.

By matching the internal cooling flow through each of the vanes to the local gas temperature, the total flow of cooling air so used may be reduced by about 25% to 40% (depending on the combustor's pattern factor) to increase engine efficiency at any given operating temperature. Alternatively, the engine's average working gas temperature can be increased, to increase power, while the now automatically metered cooling flows ensure that the vanes do not fail prematurely due to hot spots in the gas flow.

It has been determined that the combustion gas temperature is widely variable throughout most high performance turbine engines. Obviously, the average gas temperature decreases in the axial direction through the engine as energy or work is removed from the ga stream by the turbine stages, but there is also a significant local temperature variation in the radial and circumferential directions, especially in, and immediately downstream of, the combustor. The severity of such local temperature variations is related to the combustor design and is characterized in the art by a number called the "pattern factor". A combustor's pattern factor is defined as $Pf=(Th-Tn)/(Tn-Tc)$ where Th is the highest temperature measured in ° F. anywhere in the gas stream leaving the combustor, Tn is the nominal or average temperature of the entire gas stream leaving the combustor, and Tc is the temperature of the air stream entering the combustor from the compressor section of the turbine. Modern (well designed) combustors commonly have pattern factors that range from about 0.2 to 0.3. Generally, straight through combustors tend to have a Pf at the higher end of the range, sometimes exceeding 0.3, whereas the folded type combustors (annular reverse flow or illustrated later) allows better control of the pattern factor; i.e. lower values. For example, one engine tested showed Th=2525° F., Tn=2225° F. and Tc=850° F. so that Pf was about 0.22. Even though every effort was made to provide a uniform gas temperature, this well designed engine had several hot spots in which the gas temperature was as much as 300° F. greater than the nominal.

Since it is impossible to accurately predict, from one engine to the next even of the same general type, where and to what extent these hot spots will occur, some vanes will be undercooled while others nearby may be overcooled in the absence of the present invention. That is, some production engines will deviate from the hot gas profile (pattern factor) predicted by combustor development tests and the present invention will mitigate such situations.

It should now be appreciated that the thermostatic control of each vane's cooling air provided by the present invention will prevent overheating of vanes located in or near hot spots while conserving cooling air previously wasted on vanes located in cooler regions.

Other features and advantages of the present invention should become apparent from the following more detailed description of a presently preferred embodiment, taken in conjunction with the accompanying drawings, which illustrate by way of example and not limitation, the principles of the invention.

DETAILED DESCRIPTION OF A PREFERRED EMBODIMENT

Figure 1:
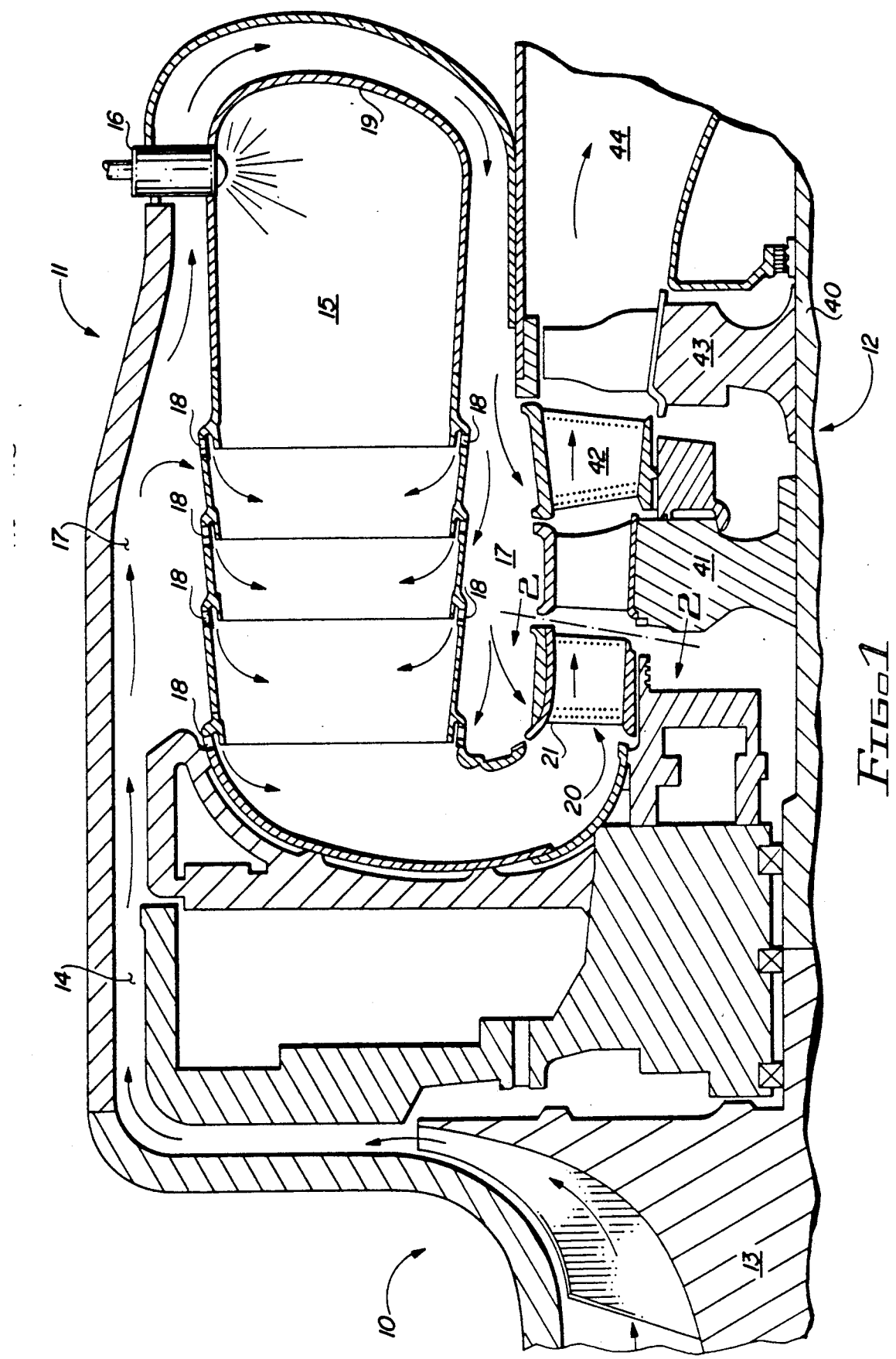
FIG. 1 is an illustration, in partial cross-section, of a portion of a gas turbine engine incorporating the present invention.

FIG. 1 illustrates a simplified gas turbine of the type having a single stage compressor section 10, an annular combustion section 11, and a two-stage turbine section 12. Not shown are several engine accessories and control systems (all well known in the art and not relevant to the present invention) which are required for proper operation as an engine.

The engine's compressor section 10 includes a radial outflow centrifugal compressor impeller 13 which has a plurality of scrolled blades for moving air into the engine. Compressed air from the impeller 13 flows through a diffuser duct 14 leading to the combustion section 11 of the engine.

The combustion section 11 includes a reverse-flow annular combustion chamber 15 where the compressed air is mixed with fuel and burned. Fuel is supplied into the chamber 15 through several injectors 16 connected to a suitable fuel control system (not shown). Air from the diffuser duct 14 flows into a plenum 17 surrounding the combustion chamber 15 and through numerous slots or holes 18 in the chamber wall 19. This arrangement helps cool the chamber wall while providing relatively good mixing of the air and fuel necessary for uniform burning. The hot combustion gases flow out of the combustion chamber 15 through an exit nozzle 20 containing guide vanes 21 which direct the high velocity gas into the power turbine section 12 of the engine. Some of the air from plenum 17 also flows through the vanes 21 for cooling as will be explained later.

This engine's turbine section 12 includes two axial-flow turbine wheels 41, 43 each having a plurality of short curved airfoils extending from a central disk or hub mounted on a rotatable shaft 40. Hot gases from the combustor section 11 are directed by the vanes 21 in the nozzle 20 to impinge at the proper angle into the airfoils at the first stage turbine wheel 41 and cause the shaft 40 to rotate. After passing through the first stage turbine wheel 41, the hot gases are redirected by guide vanes in a second stage stator 42 (very much like the first stage's nozzle) to impinge onto the airfoils of the second stage turbine wheel 43, imparting additional rotational forces to the turbine shaft 40. If there are no more turbine stages, the now cooler gases leave the engine in an axial direction through an exhaust outlet 44 downstream of the turbine section 12.

Figure 2:
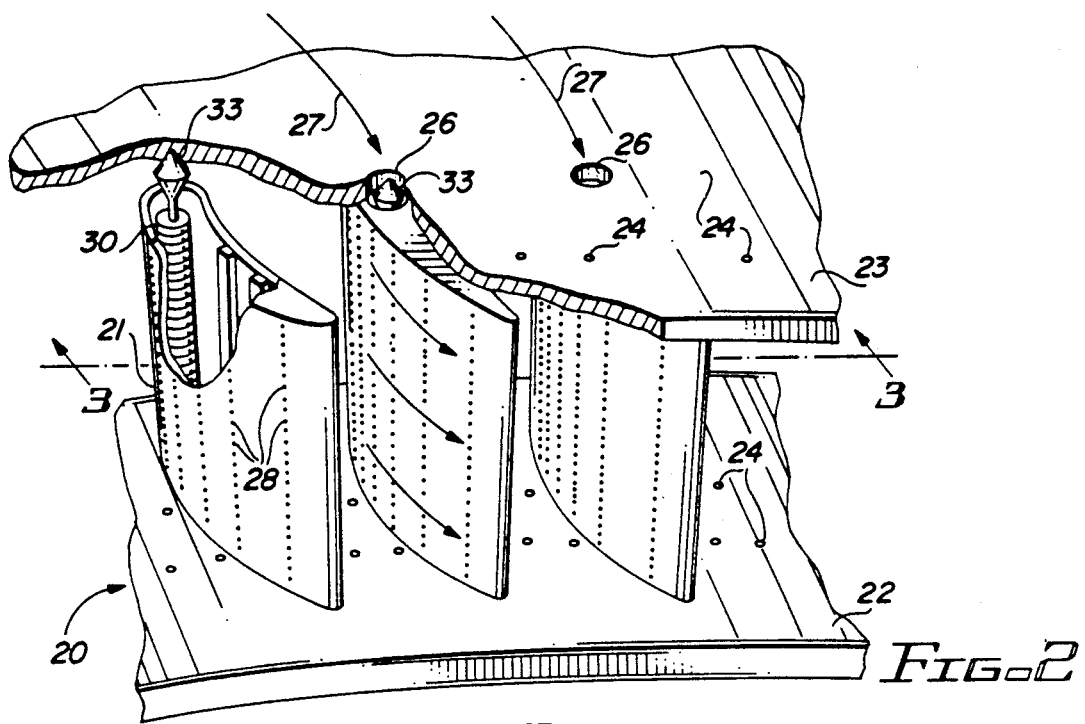
FIG. 2 is an enlarged perspective view of a segment of the guide vanes of the engine of FIG. 1.

FIG. 2 represents a portion of the combustion chamber's annular exit nozzle 20 as seen from the rear. The nozzle includes an annular inner shroud ring 22 and an outer shroud ring 23 with a dozen or more hollow guide vanes 21 extending therebetween in a generally radial direction. Generally, several small cooling passages 24 are drilled through the rings 22, 23 to allow cooling air to flow therethrough and cool the shrouds. In addition, there is at least one relatively large inlet orifice 26 through the outer plate 23 adjacent to the end of each guide vane 21, for admitting cooling air 27 into the hollow interior of the vanes, and numerous small cooling air exit holes 28 through the vane walls, for forming a cooling film along the exterior surfaces thereof as is well known in the art. Within the hollow interior of each vane 21, preferably near the leading edge, is an adjustable air control means 30 for varying the flow of air 27 through the inlet orifice 26 in response to a selected engine parameter, such as temperature or speed, as will be explained later.

Figure 3:
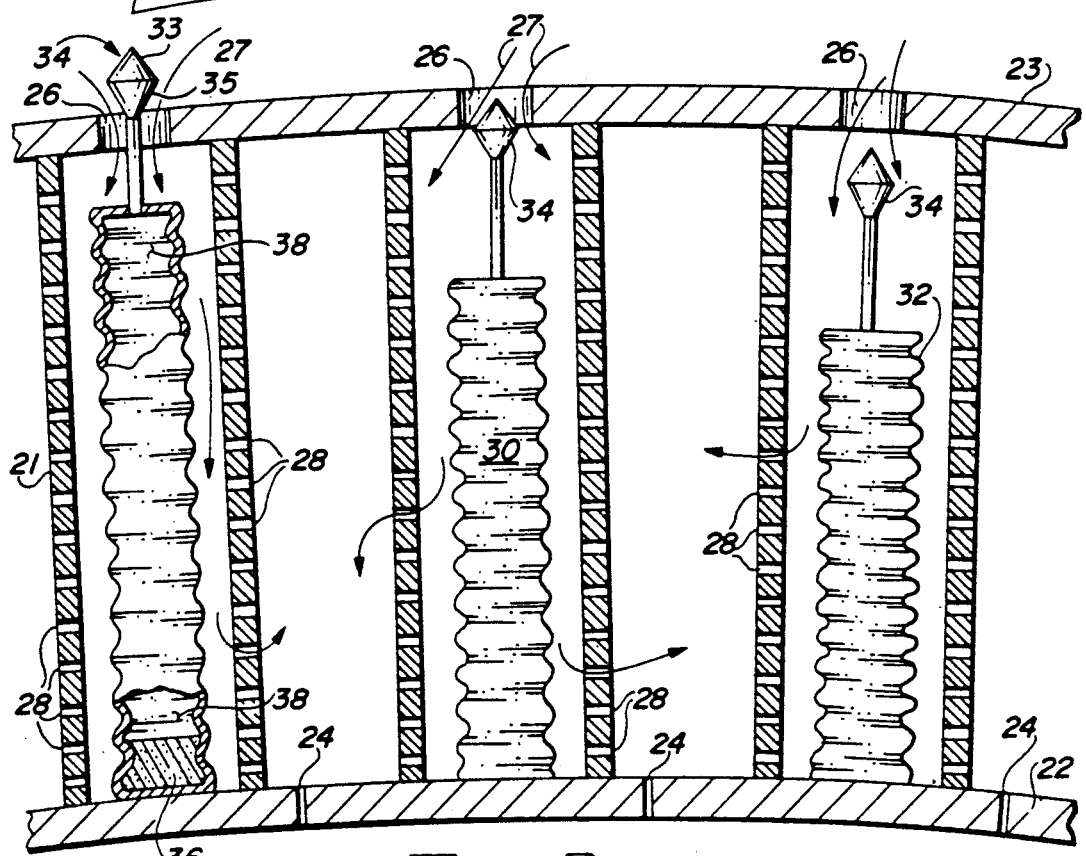
FIG. 3 is a cross-sectional view through the guide vanes of FIG. 2 illustrating details of a preferred air control device.

As shown more clearly in FIG. 3, the preferred air control means 30 is responsive to the temperature of the vane and consists of a hermetically sealed, convoluted cylinder 30, much like a bellows, with a tapered metering pin 34 attached to one end and aligned with the inlet orifice 26. Most preferably, the metering pin 34 has a top conical surface 33 and a bottom conical surface 35 so that both surfaces may be used to variably block the inlet orifice 26 as explained later. The convoluted cylinder 30 contains a small amount of material 36 which is expandable and/or vaporizable over the vane's normal operating temperature range, such as liquid sodium or lithium or the like.

During operation of the engine, air from the compressor section 10, at about 300 psi and relatively low temperature, flows into the plenum 17 surrounding the combustion chamber 15. Since the combustion process within the chamber 15 lowers the internal gas pressure by about 5% (while greatly increasing its temperature and velocity), most of the air in the plenum 17 flows through the small holes 18 and into the chamber to support combustion. A small portion 27 of the air flows into the vane's cooling air inlet orifice 26, through internal cooling passages (not shown) before leaving the vanes through the film cooling holes 28. The amount of cooling air flowing through each vane, and thus the degree of cooling provided, is controlled by the cross-sectional area of the inlet orifice 26 which varies depending on the position of the movable, tapered metering pin 34 attached to the temperature responsive bellows 32. That is, as each vane 21 is heated by the combustion gases, the pressure in the interior 38 of the convoluted cylinder 32 is increased by vaporization of the sodium 36 thereby expanding the convolutions and moving the attached metering pin 34 through the inlet orifice 26. As illustrated by the center vane in FIG. 3, there is sufficient clearance around the pin 34 to allow a desired minimum amount of air flow to cool the vanes at normal operating temperatures. However, in vanes located at hot spots, represented by the left-hand vane of FIG. 3, the pin 34 is extended so that there is additional open area between the pin's bottom conical surface 35 and the inlet orifice 26 to increase the air flow. In the event of a leak in the bellows 32, the pin 34 will retract to a fail-safe position away from the orifice as illustrated in the right-hand vane of FIG. 3. This is also the position during engine starting so that a maximum amount of cooling air will flow through all the vanes to reduce the thermal shock associated with rapidly heating a cold engine and thereby increase vane life.

While in order to comply with the statutes, this invention has been described in terms more or less specific to one preferred embodiment, it is expected that various alterations, modifications, or permutations thereof will be readily apparent to those skilled in this art. For example, instead of supplying cooling air through the outer nozzle ring, air may be supplied through the inner ring since air ducts are often provided into the interior of the turbine section for cooling other components. In addition, the present invention may be utilized in other turbine components, such as the second stage stator vanes or support struts that pass through the hot gas path, which may advantageously be cooled with a varying amount of air. Therefore, it should be understood that the invention is not to be limited to the specific features shown or described, but it is intended that all equivalents be embraced within the spirit and scope of the invention as defined by the appended claims.

What is claimed is:

1. A gas turbine engine guide nozzle, of the type having a plurality of hollow, air cooled vanes extending generally radially between annular inner and outer shroud rings, comprising:

a plurality of air inlet orifices in one of said shroud rings, with one orifice adjacent the end of each of said plurality of vanes for admitting cooling air flow into the hollow interior thereof; and a plurality of individually adjustable air control means for varying the flow of sad cooling air through each vane by variably blocking each of said orifices, said air control means contained within the hollow interior or of each vane near the leading edge thereof and including a sealed convoluted cylinder, an expandable material in said cylinder, and a metering pin attached to one end of the cylinder and aligned with said inlet orifice.

2. The nozzle of claim 1 wherein said adjustable air control means are automatically adjusted in response to a selected engine parameter.

3. The nozzle of claim 2 wherein said selected engine parameter is the temperature of the adjacent vane and said air control means is thermally responsive thereto.

4. A gas turbine engine guide nozzle, of the type having a plurality of hollow, air cooled vanes extending generally radially between annular inner and outer shroud rings, comprising:

a plurality of air inlet orifices in one of said shroud rings, with one orifice adjacent the end of each of said plurality of vanes for admitting cooling air flow into the hollow interior thereof; and a plurality of individually adjustable air control means for varying the flow of said cooling air through each vane by variably blocking each of said orifices, said air control means being automatically adjusted in thermal response to the temperature of the adjacent vane, said thermally responsive air control means being contained within the hollow interior of each vane near the leading edge thereof and includes a sealed convoluted cylinder, containing an expandable material, with a metering pin attached to one end and aligned with said inlet orifice.

5. The nozzle of claim 4 wherein said expandable material is sodium or lithium vapor.

6. The nozzle of claim 4 wherein said metering pin has a conical surface which cooperates with said inlet orifice to provide an air flow area which varies from a minimum amount at one temperature to a greater amount at a higher temperature.

7. An air cooled hollow vane for guiding hot gases within a gas turbine engine comprising:

at least one air inlet orifice and one air exit hole in the walls of said hollow vane, and an air control means for varying the flow area of said inlet orifice in response to the cooling needs of said vane, said air control means including a tapered metering pin movable within said orifice and attached to a thermally responsive bellows.

8. The vane of claim 7 wherein said thermally responsive bellows includes a sealed convoluted cylinder containing a thermally expandable material.

9. The vane of claim 8 wherein said expandable material is selected from the group consisting of sodium, lithium and the like.

10. The vane of claim 7 wherein said bellows is located internally of the leading edge of said hollow vane.

11. A method of cooling a hollow guide vane in a gas turbine engine comprising the steps of:

supplying cooling air to an orifice having a fixed cross-sectional flow area leading into said hollow guide vane, variably blocking said flow area by interposing a movable metering pin adjacent said orifice, and moving said metering pin with an attached thermally responsive actuator so that the amount of said cooling air flowing through said vane increases as the vane's temperature increases, the step of moving said metering pin including expanding a sealed convoluted cylinder, attached to said pin, by increasing the vapor pressure of a material contained therein with heat transferred from said vane.

12. A method of cooling a hollow guide vane in a gas turbine engine comprising the steps of:

supplying cooling air to an orifice having a fixed cross-sectional flow area leading into said hollow guide vane, variably blocking said flow area by interposing a movable metering pin adjacent said orifice, moving said metering pin with an attached thermally responsive actuator so that the amount of said cooling air flowing through said vane increases as the vane's temperature increases; and flowing cooling air out of numerous small exit holes in the vane to form a film of cooling air adjacent the surfaces thereof.

* * * * *